(12) United States Patent
Ahmad et al.

(10) Patent No.: US 9,134,160 B2
(45) Date of Patent: Sep. 15, 2015

(54) ONLINE MULTI-PHASE FLOW METER SYSTEM

(71) Applicant: King Fahd University of Petroleum and Minerals, Dhahran (SA)

(72) Inventors: Aftab Ahmad, Dhahran (SA); Luai M. Al-Hadhrami, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 73 days.

(21) Appl. No.: 14/143,740

(22) Filed: Dec. 30, 2013

(65) Prior Publication Data
US 2015/0185062 A1    Jul. 2, 2015

(51) Int. Cl.
    *G01F 1/74*     (2006.01)
    *G01F 7/00*     (2006.01)
    *G01F 15/08*    (2006.01)

(52) U.S. Cl.
    CPC ... *G01F 7/00* (2013.01); *G01F 1/74* (2013.01); *G01F 15/08* (2013.01)

(58) Field of Classification Search
    CPC .............. G06F 1/74; G06F 1/36; G06F 15/08
    USPC ........................................ 73/861.01, 861.04
    See application file for complete search history.

(56) References Cited

U.S. PATENT DOCUMENTS

| | | | | |
|---|---|---|---|---|
| 5,597,961 | A * | 1/1997 | Marrelli | 73/861.04 |
| 7,871,526 | B2 | 1/2011 | Allouche | |
| 2003/0129561 | A1* | 7/2003 | Hubner et al. | 433/92 |
| 2009/0199653 | A1* | 8/2009 | Kitami et al. | 73/861.04 |
| 2012/0000643 | A1* | 1/2012 | Bruun et al. | 166/75.12 |

FOREIGN PATENT DOCUMENTS

| | | |
|---|---|---|
| CN | 100406857 C | 7/2008 |
| CN | 201241690 Y | 5/2009 |
| CN | 201575838 U | 9/2010 |

* cited by examiner

*Primary Examiner* — Lisa Caputo
*Assistant Examiner* — Nathaniel T Woodward
(74) *Attorney, Agent, or Firm* — Oblon, McClelland, Maier & Neustadt, L.L.P.

(57) ABSTRACT

An online multi-phase flow meter for continuously and accurately measuring the volumetric quantities of gas, oil, and water flowing concurrently in a conventional feed pipeline, such as an oil well pipeline or a transport pipeline. The online multi-phase flow meter includes: an inlet pipe; an exit pipe; a cylindrical gas separation unit that is connected to the inlet pipe; a gas measuring system; an oil and water measuring system; a slurry collection system; a maintenance system; an electronic controller and solenoid valve for maintaining a minimum liquid level in the cylindrical gas separation unit; and a data acquisition system comprising a microprocessor. Also, a method for continuously and accurately measuring the volumetric quantities of a multi-phase mixture containing gas, oil, and water with the online multi-phase flow meter.

20 Claims, 2 Drawing Sheets

ONLINE MULTI-PHASE FLOW METER SYSTEM

BACKGROUND OF INVENTION

1. Technical Field

The present invention relates to the field of online multi-phase flow measurement. Namely, an online multi-phase flow meter for an oil well production pipeline or an oil transportation pipeline that measures the volumetric flow quantities of gas, oil, and water contained in a multi-phase mixture.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Increasingly, the measurement of multi-phase flow is a focus of attention in the oil and gas industry. An oil well produces a mixture of oil, water, and gas in normal production. In order to assess the productivity of an oil well it is necessary to know how much of these three phases: oil, water, and gas, is being produced. Accordingly, multi-phase flow meters are required to operate and manage oil fields and reservoirs. A number of multi-phase flow meters (MPFMs) have been developed; however, conventional MPFMs are highly sophisticated devices and expensive.

Conventionally, industry utilizes three-phase or two-phase separators to separate the multi-phase fluid mixture into distinctive phases. Three-phase separators separate the multi-phase fluid mixture into distinctive phases—gas, free water, and an oil/water emulsion. Thereafter, separate flow meters may measure the respective flow rates of the outgoing streams of oil, water, and gas. Also, an on-line "cut" meter determines the water content of the emulsion stream. The two-phase separators operate similarly to the three-phase separators except that the free water stream is omitted.

Due to the complex nature of crude oil mixtures, the accurate measurement of multi-phase flow rates is challenging. To measure the flow rates of multi-phase fluids, the phase fraction and phase velocity measurement devices are generally used. For instance, Venturi meters are frequently used to measure the velocity of the mixture. However, conventional two phase measurement requires separation of the two phases (oil and water), which results in the interruption of the continuous industrial process.

Ultimately, conventional test separators are relatively large in physical size, expensive to construct, and require an abundance of ancillary pressure control and flow regulating equipment. Accordingly, users of this approach do not provide the separators for an individual oil well. Instead, a single test separator services a group of wells. Each individual well is placed "on test" for a relatively short period of time, and its production is determined. After the well is removed from test, it is assumed that the production from the well does not vary substantially until the well is again placed on test.

To overcome the deficiencies of the prior art, the present invention provides a simple, easy to operate online multi-phase flow meter that continuously and accurately measures gas, oil, and water quantities on line for an individual oil well, a group of wells in oil field, or a transportation pipeline.

BRIEF SUMMARY OF INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

The present invention pertains to a system and a process for continuously and accurately measuring the volumetric quantities of gas, oil, and water flowing concurrently in a conventional feed pipeline, such as an oil well pipeline or a transport pipeline. The apparatus is an online multi-phase flow meter system that separates the gas phase from the liquid phase, which comprises oil and water, of a crude oil mixture from an oil well and measures the volumetric quantities of gas, oil, and water in the crude oil mixture without separating the oil and water in the liquid phase. After separating the gas phase from the liquid phase and measuring the volumetric quantities of gas, oil, and water, the gas phase is combined with the liquid phase to a discharge pipeline.

The online multi-phase flow meter comprises: an inlet pipe; an exit pipe outlet; a cylindrical gas separation unit that is connected to the inlet pipe; a gas measuring system; an oil and water measuring system; a slurry collection system; a maintenance system; an electronic controller; and a data acquisition system comprising a microprocessor.

In another embodiment, the online multi-phase flow meter system separates the gas phase from the liquid phase, which comprises oil and water, of a crude oil mixture, determines the quantities of the gas, oil, and water in the multi-phase fluid coming out from the oil well, and then recombines the gas phase with the liquid phase comprising oil and water.

Also provided is a process for continuously and accurately measuring the volumetric quantities of a multi-phase mixture containing gas, oil, and water with the online multi-phase flow meter without separating the liquid phase into an oil component and a water component by continuously measuring the density of the liquid phase with a density sensor and maintaining a minimum liquid level in the online multi-phase flow meter system with an electronic controller that controls a solenoid valve based on the measurements from the density sensor.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
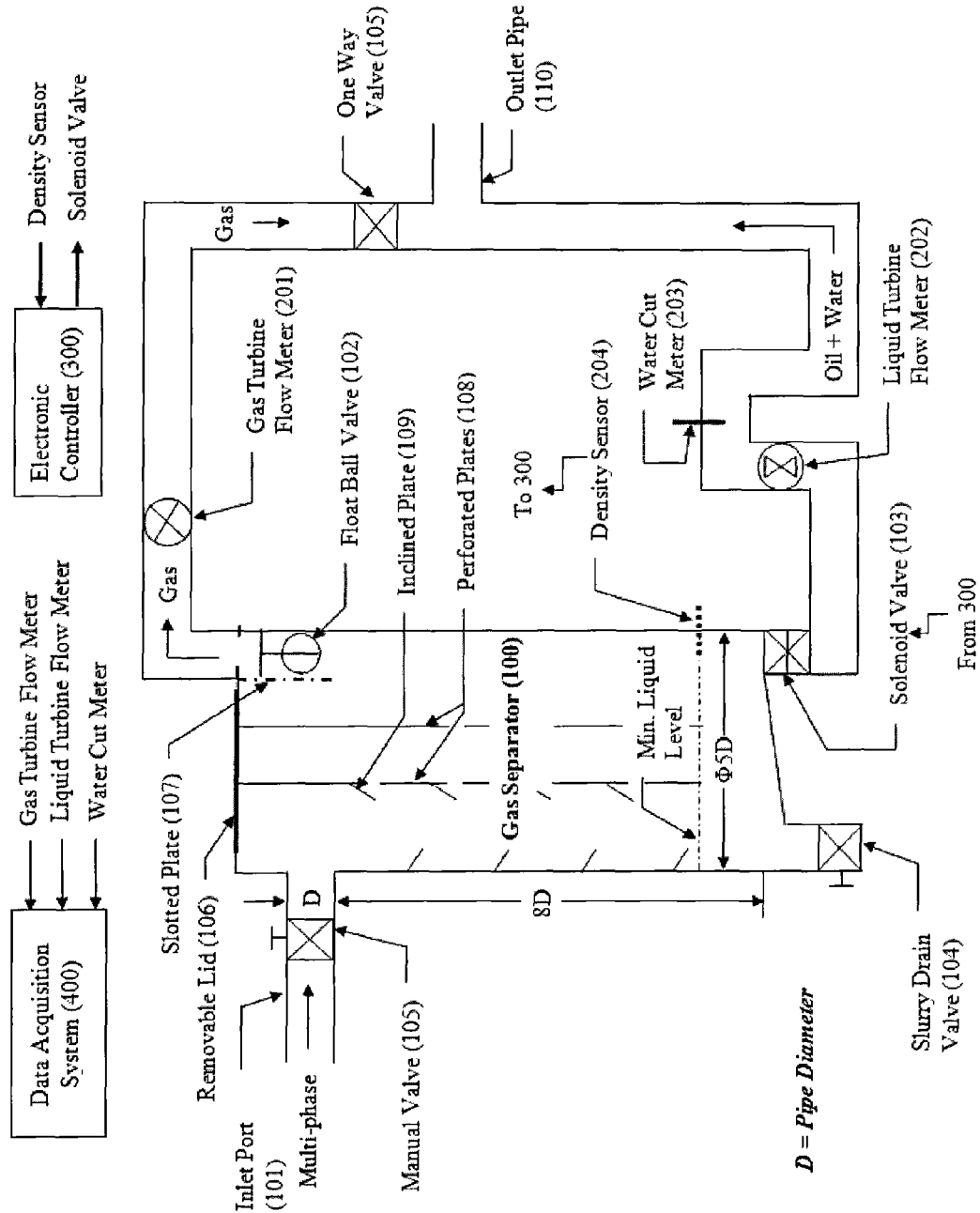
FIG. 1. depicts an online multi-phase flow meter according to the present disclosure.

Referring now to the drawing, the present invention is directed to an online multi-phase flow meter with option to measure the gas, oil, and water volumetric quantities of a crude oil mixture from a conventional feed pipeline such as an oil well pipeline or a transport pipeline. The crude oil mixture is a multi-phase fluid comprising gas, oil, and water, oil and water, oil and gas, or water and gas.

The online multi-phase flow meter comprises an inlet pipe connected to a single vertical cylindrical gas separation unit. The multi-phase fluid comprising gas, oil, and water enters the cylindrical gas separation unit on a first side and is separated into a gas phase and a liquid phase comprising oil and water. The separated gas phase exits the cylindrical gas separation unit through a float ball valve system and enters an upper outlet pipe provided on the top side of the cylindrical gas separation unit opposite to the first side. Importantly, the online multi-phase flow meter is simple in design and only includes a single vertical cylindrical gas separation unit.

The liquid phase comprising oil and water is collected at the bottom of the second side of the cylindrical gas separation unit. This two phase fluid, oil and water, exits the cylindrical gas separation unit through a first lower outlet pipe provided on the bottom of cylindrical gas separation opposite to the first side. The first lower outlet pipe has a horizontal portion upstream of an inverted U-shaped geometry portion. The oil and water content of the liquid phase are measured with a two phase measuring system comprising a liquid turbine flow meter and water-cut meter disposed in the inverted U-shaped portion of the first lower outlet pipe. The liquid turbine flow meter is upstream from the water-cut meter.

Additionally, a second lower outlet pipe is provided on the first side of the bottom of the cylindrical gas separation unit, which is opposite to the first lower outlet pipe provided on the opposite side of the cylindrical gas separation unit. Due to an inclined bottom surface, the second lower outlet pipe is positioned lower on cylindrical gas separation unit than the first lower outlet pipe. The second lower outlet pipe includes a manual valve such that any slurry that is collected may be periodically drained from the cylindrical gas separation unit through the manual valve.

For single oil well operations, the upper outlet pipe is connected to the first lower outlet pipe such that the separated gas from the upper outlet pipe and the separated liquid phase comprising oil and water from the first lower outlet pipe are mixed together downstream of the gas turbine flow meter on the upper outlet pipe and downstream of the liquid turbine flow meter and the water-cut meter on the first lower outlet pipe. The upper outlet pipe connects to the first lower outlet pipe in a T-shaped junction so that the recombined multi-phase fluid comprising gas, oil, and water exits the online multi-phase flow meter through an exit pipe outlet. Thereafter, the recombined multi-phase fluid is subjected to further processing and a delivery system.

Notably, the recombined multi-phase fluid has the same gas composition as the crude oil mixture. The recombined multi-phase fluid also has the same water and oil composition as the crude oil mixture. By only eliminating the slurry content in the crude oil mixture and recombining the gas phase with the liquid phase (oil and water), the gas to liquid mass ratio in the crude oil mixture is the same as the gas to liquid mass ratio in the recombined multi-phase fluid. Moreover, the "water fraction," which is defined as the mass ratio of the water to the sum of the water and oil is maintained. That is, the mass ratio of the water to the sum of the water and oil in the crude oil mixture is the same as the mass ratio of the water to the sum of the water and oil in the recombined multi-phase fluid. Advantageously, the gas to water and the gas to oil mass ratios are the same in the crude oil mixture and the recombined multi-phase fluid.

For automatic control, the online multi-phase flow meter includes a data acquisition system comprising a microprocessor and an electronic controller for maintaining a minimum liquid level in the cylindrical oil separation unit via a solenoid valve.

Crude oil produced from an oil-well generally comprises a mixture of an organic fluid and an aqueous medium, and may be contaminated with an organic solid. The composition of the crude oil may vary between wide limits. Typically, the liquid phase may account for up to 99 wt % or more of the crude oil mixture, at the start of production, to 10 wt % or less of the crude oil mixture, at the end of the useful commercial life of the oil well. The liquid phase comprises hydrocarbons, a minor portion of which may be gaseous under ambient conditions, such as $C_{1-3}$ hydrocarbons, and a major portion of which are liquids, such as the $C_{7+}$ ($C_7$ and greater) hydrocarbons.

The crude oil is usually primarily aliphatic in nature, but may contain up to 50% w/w liquid aromatic compounds. If derived from an oil well production head, the pressure of the crude oil mixture exiting the well bore is from 50 to 200 bar, preferably from 75 to 150 bar, more preferably 100 to 125 bar. In alternative embodiments, the crude oil mixture arises from a production platform, between platforms, from a production platform to a collection or storage facility, or from a storage facility to a gathering station or refinery prior to a separation facility that separates at least one component of the crude oil mixture. In these cases, the pressure of the crude oil mixture may be up to 50 bar, preferably in the range from 1 to 10 bar.

The gas phase content of the crude oil mixture may vary within wide limits, for instance, the gas phase may account for 1 to 50 wt % or less, from 2.5 to 40 wt %, from 5 to 30 wt %, from 7.5 to 20 wt %, or from 10 to 15 wt % or the crude oil mixture. Alternatively, the gas phase may account for 50 wt % or more to 99 wt %, from 60 to 97.5 wt %, from 70 to 95 wt %, from 80 to 92.5 wt %, or from 85 to 90 wt % of the crude oil mixture. The gas phase predominately contains light hydrocarbons, but may contain inert gases such as hydrogen, nitrogen, carbon dioxide, and noble gases. If present, the inert gases represent from 0.1 to 10 wt % or less, preferably 5 wt % or less, 3 wt % or less, or 2 wt % or less of the gas phase.

The liquid phase contains water or brine and oil. The liquid phase may be in the form of a suspension, dispersion, emulsion, or mixture. The liquid phase of the crude oil mixture may vary within wide limits, for instance, the liquid phase may account for 1 to 50 wt % or less, from 2.5 to 40 wt %, from 5 to 30 wt %, from 7.5 to 20 wt %, or from 10 to 15 wt % of the crude oil mixture. Alternatively, the liquid phase may account for 50 wt % or more to 99 wt %, from 60 to 97.5 wt %, from 70 to 95 wt %, from 80 to 92.5 wt %, or from 85 to 90 wt % of the crude oil mixture.

Within the liquid phase, the water content is generally from 10 wt % or more to 90 wt % or less of the liquid phase. During operation, the water content of the liquid phase ranges from 10 to 90 wt %, from 15 to 85 wt %, from 20 to 80 wt %, from 25 to 75 wt %, from 30 to 70 wt %, from 35 to 65 wt %, from 40 to 60 wt %, or from 45 to 55 wt %. Analogously, the oil content of the liquid phase varies from 10 to 90 wt %, from 15 to 85 wt %, from 20 to 80 wt %, from 25 to 75 wt %, from 30 to 70 wt %, from 35 to 65 wt %, from 40 to 60 wt %, or from 45 to 55 wt %.

The crude oil mixture may contain inorganic solids, such as sand or grit. Preferably the crude oil mixture contains 10 wt % or less, particularly 5 wt % or less, and even 2 wt % or less of suspended solids. Ideally, the crude oil mixture is substantially free of suspended solids, such as insoluble bitumen and tar sands and asphaltenes, and suspended inorganic solids such as formation rock.

FIG. 1 shows an embodiment of the invention in which the crude oil mixture comprising oil, gas, and water, oil and gas, or only gas enters the cylindrical gas separation vessel only through the inlet pipe (101) of the cylindrical gas separation unit (100) of the multi-phase flow meter. In a preferred embodiment the upper outlet pipe and the first lower outlet pipe form a closed loop between the cylindrical gas separation unit and the exit pipe outlet such that neither the upper outlet pipe nor the first lower outlet pipe include any further input or output pipes. The crude oil mixture containing oil, gas, water, and solid particles enters the inlet pipe (101) and is fed into the cylindrical gas separation unit (100) via a manual inlet control value (105) disposed on the inlet pipe (101).

The diameter of the inlet pipe (101), designated as "D," is from 5 to 50 cm, preferably from 10 to 40 cm, more preferably from 15 to 30 cm. When employed on a transfer pipeline, for instance between platforms or refineries, the diameter of the inlet pipe is from about 45 to 150 cm, for instance, from 45 to 60 cm, from 60 to 90 cm, from 90 to 120 cm, or from 120 to 150 cm. The online multi-phase flow meter may in the form of a slipstream device on any of the aforementioned pipelines.

The cylindrical gas separation unit (100) has a diameter from 2 to 10 times the diameter of the inlet pipe, preferably 3 to 7 times the diameter of the inlet pipe, more preferably 4 to 6 times the diameter of the inlet pipe, and most preferably 5 times the diameter of the inlet pipe. When the diameter of the inlet pipe (101) is from 5 to 50 cm, the diameter of the cylindrical gas separation unit (100) is from 10 to 500 cm, preferably from 15 to 350 cm, especially from 20 to 300 cm. When the diameter of the inlet pipe (101) is from 10 to 40 cm, the diameter of the cylindrical gas separation unit (100) is from 20 to 400 cm, preferably from 30 to 280 cm, especially from 40 to 240 cm. When the diameter of the inlet pipe (101) is from 15 to 30 cm, the diameter of the cylindrical gas separation unit (100) is from 30 to 300 cm, preferably from 45 to 210 cm, especially from 60 to 180 cm.

The cylindrical gas separation unit (100) has a height of about 5 to 15 times the diameter of the inlet pipe, preferably 7 to 12 times the diameter of the inlet pipe, more preferably 8 to 10 times the diameter of the inlet pipe. Advantageously, the diameter or the cylindrical gas separation unit (100) is about 5 times the diameter of the inlet pipe and the height is about 8 times the diameter of the inlet pipe. When the diameter of the inlet pipe (101) is from 5 to 50 cm, the height of the cylindrical gas separation unit (100) is from 25 to 750 cm, preferably from 35 to 600 cm, especially from 40 to 500 cm. When the diameter of the inlet pipe (101) is from 10 to 40 cm, the height of the cylindrical gas separation unit (100) is from 50 to 600 cm, preferably from 70 to 480 cm, especially from 80 to 400 cm. When the diameter of the inlet pipe (101) is from 15 to 30 cm, the height of the cylindrical gas separation unit (100) is from 75 to 450 cm, preferably from 105 to 360 cm, especially from 120 to 300 cm.

The cylindrical gas separation unit (100) contains at least one perforated impingement plate (108). The perforated impingement plates (108) are equipped with inclined plates (109). Additionally, the inner surface of the cylindrical gas separation unit (100) may be equipped with inclined plates (109). In the cylindrical gas separation unit (100), the multi-phase fluid mixture impinges the perforated plates (108) and the inclined plates (109), such that the gas is separated from the multi-phase fluid mixture while the oil and water settles at a bottom portion of the cylindrical gas separation unit (100).

Although the cylindrical gas separation unit (100) may contain a single perforated impingement plate (108), preferably the cylindrical gas separation unit (100) is equipped with at least 2, at least 5, or 10 perforated impingement plates (108). The inclined plates (109) disposed on the perforated impingement plates (108) may be detachable. The angle of incline of the inclined plates (109) from the vertically disposed perforated impingement plates (108) is at least 5° and less than 45°, preferably from 10-30°, particularly from 15-30°.

The perforations in the perforated impingement plates (108) are evenly spaced. In an alternative embodiment, the spacing of the perforations increases or decreases towards the bottom portion of the cylindrical gas separation unit (100). Where the cylindrical gas separation unit (100) includes a plurality of perforated impingement plates (108), the perforations of adjacent impingement plates may be offset vertically such that the perforations of adjacent impingement do not overlap horizontally. The perforated impingement plates may be made of a steel sheet having a thickness between 1 to 5 mm and provided with uniform punch holes having diameters from 1 to 20 mm, from 2 to 20 mm, and even from 2 to 5 mm. The punch holes may be also be oval in shape.

The perforated impingement plates (108) are evenly spaced from one another. However, the spacing between adjacent perforated impingement plates (108) may increase or decrease from the inlet side towards the outlet side of the cylindrical gas separation unit. Alternatively, the cylindrical gas separation unit may be a rotational centrifuge separator.

The separated gas phase from the cylindrical gas separation unit (100) passes through a floating ball valve assembly (102) provided on top side of the cylindrical gas separation unit (100). The separated gas passes through this ball valve into an upper outlet pipe connected to the top of the cylindrical gas separation unit (100). By employing a ball type floating valve, the separated gas is permitted to pass through a slotted plate (107) disposed on the upper surface of the cylindrical gas separation unit (100) while, at the same time, preventing any fluid flow into the upper outlet pipe due to any excessive quantity of liquid in the cylindrical gas separation unit (100). For instance, in the case there is a malfunction in the solenoid valve (103) that maintains a minimum level of liquid in the cylindrical gas separation unit (100), the floating ball of the floating ball valve assembly (102) rises and seals off the upper outlet pipe from the cylindrical gas separation unit (100).

Additionally, the cylindrical gas separation unit (100) may include a mist collection device adjacent to the slotted plate (107) or in the upper outlet pipe contiguous with the connection to the cylindrical gas separation unit (100). The mist collection device collects any liquid that may be entrained in the gas phase after passing through the perforated plates (108). Any liquid collected by the mist collection device is returned to the cylindrical gas separation unit.

The upper outlet piper is equipped with a gas flow meter (201) that measures the volumetric flow rate of the separated gas. The gas flow meter (201) may be an orifice meter, a turbine meter, or a vortex shedding meter. In a preferred embodiment, the gas flow meter (201) is a gas turbine flow meter. Notably, gas flow in the present invention is directly measured rather than being calculated on the basis of statistical variations occurring in measured values of oil and water fractions caused by the presence of gas bubbles.

The upper outlet pipe is also equipped with a one way valve (105) downstream from the gas turbine flow meter. The one way valve (105) prevents the separated liquid phase from flowing back into the upper outlet pipe. The upper outlet pipe may include gas-liquid buffer tank.

The liquid phase, which is two phase oil and water mixture, exits the cylindrical gas separation unit through a first lower outlet pipe disposed on the bottom side of the cylindrical gas separation unit (100) opposite to the entry side of the inlet pipe. The diameter of the first lower outlet pipe is equal to the diameter of the inlet pipe (101) and the first lower outlet pipe has a horizontal portion upstream from an inverted U-shaped pipe portion. The first lower outlet pipe is also provided with a solenoid valve (103), a liquid flow meter (202), and a water-cut meter (203).

An electronic controller (300) is provided to maintain a minimum level of liquid inside the cylindrical gas separation unit (100) using the solenoid valve (103) and a density sensor (204), thereby providing automatic operation of the online multi-phase flow meter. The minimum level of liquid is maintained inside the gas separation unit by continuously controlling the operation of the solenoid valve (103) with the density sensor (204) and the electronic controller (300). The minimum level of liquid is at least 1% of the height of the gas separation unit and at most 50% of the height of the gas separation unit, where the height cylindrical gas separation unit is measured from the top surface of the cylindrical gas separation unit to the highest point of the inclined bottom surface of the cylindrical separation unit. The minimum level of liquid is at least 5%, at least 10%, at least 20%, at least 30%, at least 40%, at least 50%, or even at least 60% of the height of the cylindrical gas separation unit. The maximum level of the liquid is less than 80%, less than 70%, less than 60%, less than 50%, less than 40%, less than 30%, or even less than 20% of the height of the cylindrical gas separation unit (100).

Maintaining a minimum liquid level within the cylindrical gas separation unit (100) allows the liquid to have a sufficient resident time to stay in the cylindrical gas separation unit (100) such that any trapped gas in the liquid is released and discharged through the upper outlet pipe. Additionally, maintaining a minimum liquid level ensures that the first lower outlet pipe is full of liquid for proper operation of the liquid flow meter (202).

If the liquid level falls below a desired set point, the electronic controller (300) sends a signal to the solenoid valve (103) and decreases the throughput of liquid exiting the cylindrical gas separation unit out of the first lower outlet pipe by partially or completely opening the solenoid valve (103). As the solenoid valve is opened, the pressure in the gas space in the cylindrical gas separation unit decreases, which forces the rate of liquid discharge to decrease thus increasing the liquid level in the cylindrical gas separation unit. Alternatively, if the liquid level exceeds a desired set point, the electronic controller (300) sends a signal to the solenoid valve (103) and increases the throughput of liquid exiting the cylindrical gas separation unit out of the first lower outlet pipe by partially or completely closing the solenoid valve (103). As the solenoid valve is closed, the pressure in the gas space in the cylindrical gas separation unit increases, which forces the rate of liquid discharge to increase thus lowering the liquid level in the cylindrical gas separation unit. The electronic controller may be integrated or driven remotely.

Together the liquid flow meter (202) and the water-cut meter (203) measure the volumetric quantities of oil and water, respectively. The liquid flow meter (202) and the water-cut meter (203) are disposed in the inverted U-shape portion of the first lower outlet pipe and the liquid flow meter is upstream of the water-cut meter. The liquid flow meter (202) measures the volumetric quantity of oil present in the two phase oil and water mixture, whereas the water-cut meter (203) measures the volumetric quantity of water present in the two phase oil and water mixture.

The liquid flow meter (202) in the first lower outlet pipe may be a turbine meter, a positive displacement meter, or a Coriolis meter. In a preferred embodiment, the liquid flow meter (202) is a liquid turbine flow meter. The liquid flow meter (202) preferably does not include orifice plates, which cause a high pressure drop in the system.

The water-cut meter (203) in the first lower outlet pipe may operate on capacitance measurement, microwave measurement, radio frequency energy absorption, NIR, or density differential principles. When a Coriolis force flow meter is employed as a liquid flow meter (202), it can simultaneously serve as the water cut analyzer (203) because this type of flow meter also provides density measurement of the liquid phase.

The multi-phase fluid consisting of oil, water, and solid particles is collected at the bottom section of the cylindrical gas separation unit (100). Any slurry that contained in the multi-phase fluid settles on the bottom surface of the cylindrical gas separation unit.

The bottom of the cylindrical gas separation unit (100) is positively inclined from the input side to the output side of the cylindrical gas separation unit (100) such that any slurry and inorganic solids are collected by gravity in a second lower outlet pipe provided on the input side of the cylindrical gas separation unit, i.e., at the bottom and on the same side of the cylindrical gas separation unit (100) as the inlet pipe (101). The second lower outlet pipe is fitted with a drain valve (104), which, when opened periodically, permits cleaning of the online multi-phase flow meter by removing any slurry or inorganic particles.

In addition, the online multi-phase flow meter is equipped with a removable lid (106) on top of the cylindrical gas separation unit (100). The removable lid allows the online multi-phase flow meter to be cleaned easily and periodically. In addition, the incorporation of a removable lid (106) on the cylindrical gas separation unit (100), allows components of the cylindrical gas separation unit, such as the floating ball valve assembly (102), the slotted plate (107), the perforated plates (108), and the inclined plates (109), to be replaced easily.

The upper inlet pipe and the first lower outlet pipe connect downstream from the one way valve (105) and the water cut meter (203) and form a three way junction with an exit pipe outlet. Consequently, after passing through the inverted U-shaped pipe portion of the first lower outlet pipe, the two phase oil and water mixture is admixed with the separated gas phase passing through the one way valve on the upper outlet pipe. That is, the separated gas phase and liquid phase, which is an oil and water mixture, are combined downstream from the one way valve (105) and the water cut meter (203) and exit the online multi-phase flow meter through the exit pipe outlet (110).

In an alternate embodiment, the inert gases contained in the gas phase are separated out upstream of the one way valve (105) such that only the combustible hydrocarbon components pass through the one way valve and recombine with the liquid phase comprising oil and water mixture from the first lower outlet pipe.

The microprocessor based data acquisition system (400) is used for data collection and recording. The gas flow meter (201), liquid flow meter (202), and water-cut meter (203) are connected to the microprocessor based data acquisition system (400). The real-time data is monitored and stored in the data acquisition system memory and then transferred to centralized control office through remote communication facilities.

The electronic controller (300) is used for maintaining a minimum level of liquid inside the cylindrical gas separation unit. In a preferred embodiment, by automatically controlling the minimum level of liquid in the cylindrical gas separation unit the electronic controller, no additional electronic controllers are necessary. Specifically, the online multi-phase flow meter is operated with only a single electronic controller that controls the solenoid valve rather than employing separate controllers, e.g., a water phase controller, a gas-liquid phase controller, ect.

Also provided is a process for continuously and accurately measuring the volumetric quantities of gas, oil, and water in a multi-phase fluid, particularly from an oil well. In the process according to the invention, the multi-phase fluid enters the vertical cylindrical gas separation unit (100) via the inlet pipe (101) equipped with the manual value (105). In the cylindrical gas separation unit (100), the multi-phase fluid impinges the perforated impingement plates (108) to form a gas phase stream and a liquid phase stream. The gas phase stream rises to the top of the cylindrical gas separation unit (100) and exits the cylindrical gas separation unit through the floating ball valve assembly (102) and the slotted plate (107). Upon exiting the cylindrical gas separation unit (100) the gas phase stream passes through a gas flow meter (201), which measures the volumetric flow rate of the gas stream. Preferably, the gas flow meter is a gas turbine flow meter.

Simultaneously, the liquid phase stream and any slurry or inorganic solids settle in the bottom of the cylindrical gas separation unit (100). Due to the inclined bottom surface of the cylindrical gas separation unit, any slurry or inorganic solids present in the liquid phase are further separated from the liquid phase and collect in the second lower outlet pipe equipped with the slurry drain valve (104) which, when opened periodically, permits cleaning of the online multi-phase flow meter by removing the slurry or inorganic particles.

The liquid phase stream comprising oil and water exits the cylindrical gas separation unit (100) into the first lower outlet pipe equipped with the solenoid valve (103), which maintains a minimum liquid level in the cylindrical gas separation unit. The liquid phase stream passes through the horizontal portion of the first lower outlet pipe into the inverted U-shaped portion containing the liquid flow meter (202) and the water-cut meter (203). In a preferred embodiment the liquid flow meter (202) is upstream of the water-cut meter (203).

Maintaining a minimum liquid level within the cylindrical gas separation unit (100) provides the liquid phase stream with a sufficient resident time to stay in the cylindrical gas separation unit (100) such that any trapped gas in the liquid is released and discharged through the upper outlet pipe. Additionally, maintaining a minimum liquid level ensures that the first lower outlet pipe is full of liquid for proper continuous operation of the liquid flow meter (202).

The minimum level of liquid is maintained inside the gas separation unit by continuously controlling the operation of the solenoid valve (103) with the electronic controller (300) based on continuous measurements from the density sensor (204). If the liquid level falls below a desired set point, the electronic controller (300) sends a signal to the solenoid valve (103) and decreases the throughput of liquid exiting the cylindrical gas separation unit out of the first lower outlet pipe by partially or completely opening the solenoid valve (103). As the solenoid valve is opened, the pressure in the gas space in the cylindrical gas separation unit decreases, which forces the rate of liquid discharge to decrease thus increasing the liquid level in the cylindrical gas separation unit. Alternatively, if the liquid level exceeds a desired set point, the electronic controller (300) sends a signal to the solenoid valve (103) and increases the throughput of liquid exiting the cylindrical gas separation unit out of the first lower outlet pipe by partially or completely closing the solenoid valve (103). As the solenoid valve is closed, the pressure in the gas space in the cylindrical gas separation unit increases, which forces the rate of liquid discharge to increase thus lowering the liquid level in the cylindrical gas separation unit.

Together the liquid flow meter (202) and the water-cut meter (203) measure the volumetric quantities of oil and water, respectively, in the liquid phase stream. The liquid flow meter (202) and the water-cut meter (203) are disposed in the inverted U-shape portion of the first lower outlet pipe and the liquid turbine flow meter is upstream of the water-cut meter.

The liquid flow meter (202) measures the volumetric quantity of oil present in the two phase oil and water mixture, whereas the water-cut meter (203) measures the volumetric quantity of water present in the two phase oil and water mixture. Preferably, the liquid flow meter (202) is a liquid turbine flow meter.

After measuring the volumetric quantity of the gas phase stream in the upper outlet pipe with the gas flow meter (201) and the volumetric quantities of oil and water of the liquid phase stream in the first lower outlet pipe with the liquid flow meter (202) and the water-cut meter (203), the gas phase stream and the liquid phase stream are recombined in a three way T-shaped junction downstream from the one way valve (105) on the upper outlet pipe, to form a recombined multi-phase fluid mixture comprising oil, water, and gas that exits the online multi-phase flow meter via an outlet exit pipe. Consequently, after passing through the inverted U-shaped pipe portion of the first lower outlet pipe, the liquid phase stream is admixed with the gas phase stream passing through the one way valve on the upper outlet pipe. That is, the separated liquid phase stream is recombined with the gas phase stream downstream from the one way valve (105) and the water cut meter (203), and then the recombined multi-phase fluid exits the online multi-phase flow meter through the exit pipe outlet (110).

By recombining the gas stream with the liquid phase stream, the recombined multi-phase fluid has the same gas composition as the crude oil mixture. The recombined multi-phase fluid also has the same water and oil composition as the crude oil mixture. By only eliminating the slurry content in the crude oil mixture and recombining the separated gas phase stream with the separated liquid phase stream (oil and water), the gas to liquid mass ratio in the crude oil mixture is the same as the gas to liquid mass ratio in the recombined multi-phase fluid. Moreover, the "water fraction," which is defined as the mass ratio of the water to the sum of the water and oil is maintained. Advantageously, the gas to water and the gas to oil mass ratios are the same in the crude oil mixture and the recombined multi-phase fluid.

In an alternative embodiment, noncombustible gases contained in the gas stream, for instance, noble gases, carbon dioxide, and nitrogen, are separated from the gas phase stream before the gas phase stream is recombined with the liquid phase stream. In such a case, only the combustible hydrocarbon gases contained in the gas phase stream pass through the one way valve and recombine with the two phase oil and water mixture from the first lower outlet pipe. Preferably, however, the upper outlet pipe and the first lower outlet pipe form a closed loop between the cylindrical gas separation unit and the exit pipe outlet such that neither the upper outlet pipe nor the first lower outlet pipe include any further input or output pipes.

Throughout the process, the microprocessor based data acquisition system (400) is used for data collection and recording. The gas flow meter (201), liquid flow meter (202), and water-cut meter (203) are connected to the microprocessor based data acquisition system (400). Real-time data is collected, monitored, and stored in the data acquisition system memory and then transferred to centralized control office through remote communication facilities.

Figure 2:
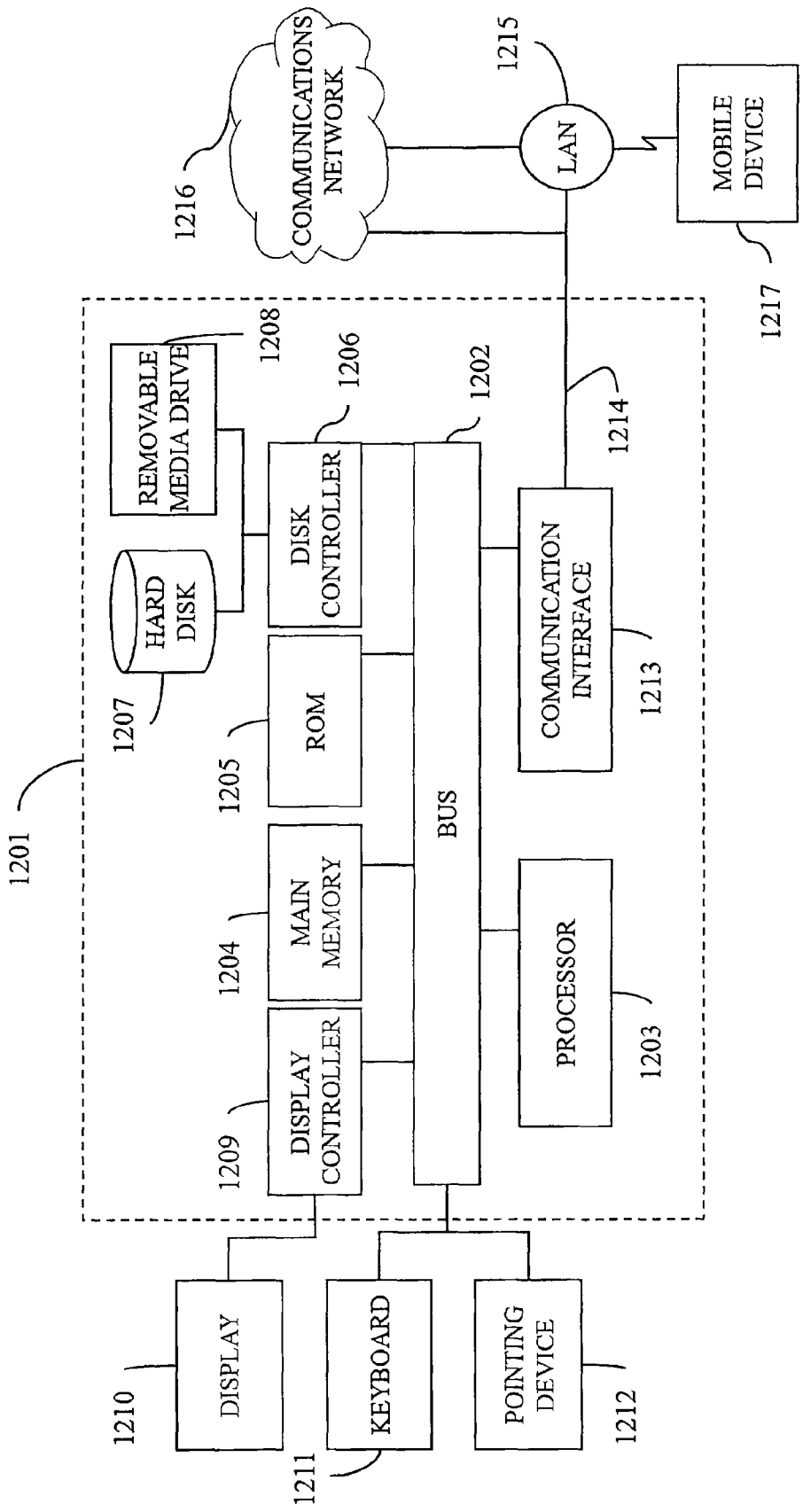
FIG. 2 illustrates a computer system 1201 upon which an embodiment of the present invention may be implemented.

FIG. 2 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. An online multi-phase flow meter, comprising:
an inlet pipe;
an exit outlet pipe;
a single vertical cylindrical gas separation unit connected at an upper portion on a first side to the inlet pipe, wherein the bottom surface of the cylindrical gas separation unit is positively inclined from the first side to a second side, which is opposite to the first side of the cylindrical gas separation unit;
an upper outlet pipe disposed on the top of the cylindrical gas separation unit at the second side, wherein upper outlet pipe comprises a gas flow meter and a one way valve, and wherein the gas flow meter is upstream from the one way valve;
a first lower outlet pipe disposed on the bottom of the cylindrical gas separation unit on the second side, wherein the first lower outlet pipe comprises a vertical portion comprising a solenoid valve, a horizontal portion, an inverted U-shaped portion comprising a liquid flow meter and a water cut meter, wherein the vertical portion is connected to the bottom of the cylindrical gas separation unit and is upstream of the horizontal portion, the horizontal portion is upstream of the inverted U-shaped portion, and the liquid flow meter is disposed upstream of the water cut meter in the inverted U-shaped portion;
a second lower outlet pipe disposed on the bottom of the cylindrical gas separation unit on the first side, wherein the second lower outlet pipe comprises a drain valve;
a T-shaped junction formed between the upper outlet pipe and the first lower outlet pipe and the exit pipe outlet, wherein the T-shaped junction is downstream from the one way valve, and
a data acquisition system comprising a microprocessor, which collects data from the gas flow meter, the liquid flow meter, and the water cut meter; and
an electronic controller, which controls the solenoid valve and maintains a minimum level of liquid inside the cylindrical gas separation unit,
wherein the cylindrical gas separation unit comprises a perforated plate, a slotted plate connected to the top inner surface of the cylindrical gas separation unit, a float ball valve system disposed under the upper outlet pipe and between the slotted plate and the second side of the cylindrical gas separation unit, and a density sensor that communicates with the solenoid valve via the electronic controller,
wherein the perforated plate comprises inclined plates.

2. The online multi-phase flow meter of claim 1, wherein the online multi-phase flow meter does not comprise an oil and water separation unit.

3. The online multi-phase flow meter of claim 1, wherein the upper outlet pipe and the first lower outlet pipe form a closed loop between the cylindrical gas separation unit and the exit pipe outlet.

4. The online multi-phase flow meter of claim 1, wherein the diameter of the cylindrical gas separation unit is 4 to 6 times the diameter of the inlet pipe and the height of the cylindrical gas separation unit is from 8 to 10 times the diameter of the inlet pipe.

5. The online multi-phase flow meter of claim 1, wherein the diameter of the first lower outlet pipe is equal to the diameter of the inlet pipe.

6. The online multi-phase flow meter of claim 1, wherein the diameter of the cylindrical gas separation unit is from 5 to 50 cm.

7. The online multi-phase flow meter of claim 1, wherein the cylindrical gas separation unit comprises from 5 to 10 vertical perforated impingement plates and the perforations of the impingement plates are offset vertically such that adjacent perforations do not overlap horizontally.

8. The online multi-phase flow meter of claim 1, wherein the gas flow meter is an orifice meter, a turbine meter, or a vortex shedding meter.

9. The online multi-phase flow meter of claim 1, wherein the gas flow meter is a gas turbine meter.

10. The online multi-phase flow meter of claim 1, wherein the liquid flow meter is a turbine meter, a positive displacement meter, or a Coriolis meter.

11. The online multi-phase flow meter of claim 1, wherein the liquid flow meter is a liquid turbine flow meter.

12. The online multi-phase flow meter of claim 1, wherein the top surface of the cylindrical gas separation unit is detachable.

13. The online multi-phase flow meter of claim 1, wherein the inlet pipe serves as the only input into the online multi-phase flow meter and the exit outlet pipe and the second outlet pipe are the only outputs from the online multi-phase flow meter.

14. The online multi-phase flow meter of claim 1, wherein the minimum liquid level in the cylindrical gas separation unit is at least 1% and less than 30% of the height of the cylindrical gas separation unit.

15. A process for determining the volumetric flow rate of gas, oil, and water in a multiphase mixture, the process comprising:
   passing a multiphase mixture comprising gas, oil, and water into the online multi-phase flow meter of claim 1, whereby the gas phase is separated from the liquid phase in the cylindrical gas separation unit to form a gas phase stream, which passes into the upper outlet pipe, and a liquid phase stream comprising oil and water, which passes into the first lower outlet pipe;
   continuously passing the multiphase mixture through the online multi-phase flow meter by maintaining a minimum liquid level in the cylindrical gas separation unit by opening or closing the solenoid valve with the electronic controller based on the density of the liquid phase measured by the density sensor;
   continuously measuring the volumetric quantity of gas in the gas stream in the upper outlet pipe with the gas flow meter, the volumetric quantity of oil in the liquid stream in the first lower outlet pipe with the liquid flow meter, and the volumetric quantity of water in the liquid stream in the first lower outlet pipe with the water-cut meter, wherein volumetric quantities of the gas, oil, and water are stored in the data acquisition system; and
   recombining the gas phase stream with the liquid phase stream in the T-shaped junction, to form a recombined multi-phase mixture that exits the online multi-phase flow meter via the outlet exit pipe.

16. The process of claim 15, wherein the online multi-phase flow meter does not comprise an oil and water separation unit.

17. The process of claim 15, wherein the upper outlet pipe and the first lower outlet pipe form a closed loop between the cylindrical gas separation unit and the exit pipe outlet.

18. The process of claim 15, wherein the diameter of the cylindrical gas separation unit is 4 to 6 times the diameter of the inlet pipe and the height of the cylindrical gas separation unit is from 8 to 10 times the diameter of the inlet pipe.

19. The process of claim 15, wherein the gas flow meter is a gas turbine meter and the liquid flow meter is a liquid turbine flow meter.

20. The process of claim 15, wherein the composition of the multiphase mixture is the same as the recombined multiphase mixture.

* * * * *